United States Patent Office 3,432,494
Patented Mar. 11, 1969

3,432,494
ARYL ALKYL ARSINIC ACIDS AND
SALTS THEREOF
Max Eugene Chiddix, Easton, Pa., and Edward Oliver
Leonard, Bound Brook, N.J., assignors to GAF Corporation, a corporation of Delaware
No Drawing. Filed May 19, 1966, Ser. No. 551,213
U.S. Cl. 260—242                    11 Claims
Int. Cl. C07f 9/76; A01n 9/24

This invention relates to novel arsinic acid compounds having improved herbicidal activity.

Novel arsinic acid compounds falling within the purview of this invention are those having the general formula:

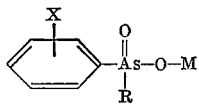

wherein X represents a member selected from the group consisting of hydrogen, halogen and lower alkoxy radicals; R represents a member selected from the group consisting of allyl, 2-hydroxy lower alkyl, and 2-aryl-2-hydroxy lower alkyl; and M represents a member selected from the group consisting of hydrogen, and a salt-forming moiety.

More particularly our invention pertains to arsinic acid derivatives of alkyl aryl arsinic acids useful as herbicides and having the following general formula:

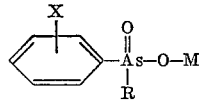

wherein X represents a member selected from the group consisting of hydrogen, ortho-, meta- and para-chlorine and ortho-, meta-, and para-methoxy radicals; R represents a member selected from the group consisting of allyl, 2-hydroxy lower alkyl and 2-phenyl-2-hydroxyethyl radicals; and M represents a member selected from the group consisting of hydrogen, an alkali metal, such as sodium, potassium, etc., an alkaline earth metal such as magnesium, calcium, barium, etc., an ammonium ion ($NH_4+$), and an amine salt such as a moiety from an amine such as methylamine, trimethylamine, triethylamine, ethanolamine, dibutylamine, ethylene diamine, morpholine, pyridine and the like.

Certain arsenic compounds have found use as herbicides (U.S. 3,130,035). However, we have discovered a new, unobvious class of compounds having an exceptionally high and unexpected degree of effectiveness in their herbicidal activity. The above free acids and their salts are useful as herbicides and in particular as weed killers and defoliants. In a living plant, because of the effect of buffer salts the arsinic acid undoubtedly is converted to a salt during translocation. Moreover, the arsinic acids of this invention form double salts with rare earth chlorides, nitrates and sulfates, and hence, are also useful in the purification of rare earths.

The arsinic acid compounds of this invention are useful against all types of weeds and plants, including deciduous trees, vines, broadleaf plants, cereals, cotton, beans, and peas and may be applied at a rate equivalent to about between 0.1 pound to about 10 pounds per acre. Furthermore, it is immaterial as to how the subject arsinic compounds are applied, since applicants know of no reason that would bar their use by any known method.

Novel compounds of the instant invention may be prepared by reacting the salts of various arsenite compounds with allyl halides of alkylene oxides to form the arsinic acid salt which may be readily acidified to produce the corresponding free acids as illustrated by the following reactions:

(1)
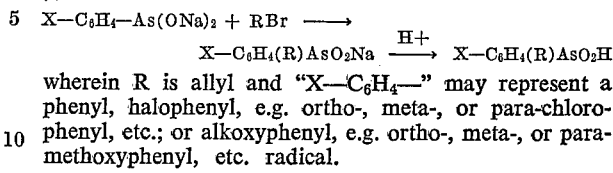

wherein R is allyl and "X—$C_6H_4$—" may represent a phenyl, halophenyl, e.g. ortho-, meta-, or para-chlorophenyl, etc.; or alkoxyphenyl, e.g. ortho-, meta-, or para-methoxyphenyl, etc. radical.

(2)
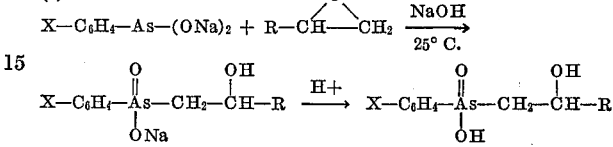

wherein "X—$C_6H_4$—" may represent a radical as defined above and R is hydrogen, phenyl or lower alkyl, such as methyl, ethyl, propyl and butyl.

The intermediate aryl starting materials used in the preparation of the subject compounds may be prepared according to the following known reactions:

(3) $As(ONa)_3 + X—C_6H_4N_2Cl \rightarrow X—C_6H_4AsO(ONa)_2$
(4) $X—C_6H_4AsO(ONa)_2 + HCl$
$+SO_2 \rightarrow X—C_6H_4AsCl_2$
(5) $X—C_6H_4AsCl_2 + NaOH \rightarrow X—C_6H_4As(ONa)_2$ In the above reactions, 3 to 5, X represents a member selected from the group consisting of hydrogen, halogen and alkoxy radicals. Said reactions may be found more fully described in J. Am. Chem. Soc., 44, pages 805 and 1356 (1922).

It is obvious from reactions 1 and 2, depicted above, that an alkali metal salt of the arsinic acid is formed first and that the free acid can be obtained by acidification. Other salts, such as alkaline earth metal salts, the ammonium salt, an amine salt or other alkali metal salts may be prepared by neutralizing the free acid with the corresponding base. This does not depart from the scope of the instant invention, since the salt is merely a matter of choice.

As examples of the various alkali metal arylarsenite starting materials there may be mentioned sodium phenylarsenite, sodium o-, m-, p-chlorophenylarsenite, sodium o-, m-, p-methoxyphenylarsenite, potassium phenylarsenite, potassium o-, m-, and p-methoxyphenylarsenite and the like.

Examples of various bases which may be used to neutralize the arsinic acids are as follows: calcium hydroxide, calcium carbonate, magnesium hydroxide, barium hydroxide, lithium hydroxide, ammonium hydroxide, trimethylamine, triethylamine, methylamine, dimethylamine, ethanolamine, diethanolamine, triethanolamine, ethylene diamine, morpholine, piperidine, pyridine, imidazoline, In order to demonstrate the exceptional herbicidal activity of the instant subject compounds, we have performed the following test.

In a spray cabinet of Plexiglas having a bottom area of three square feet were placed pots containing plants of broadleaf species, i.e., Black Valentine Bean, Heavenly Blue Morning-glory, Scarlet Globe Radish and Lincoln Soybean, along with cereal species, i.e. Clinton Oats and Rice, P.I. 8970. A spray solution was made up by dissolving 34 mg. of the test compound in 12.5 ml. of acetone or water containing 0.5% Tween 20. If not soluble, a fine suspension in water was used. Seven days after planting, 12 ml. of the spray solution were vertically directed evenly over the three square feet of area and on to the potted seedlings at a spray rate equivalent to 1 pound per acre. The spray was applied to twelve pots simultaneously (two pots of each species). Visual observations were then made of four plants of each broadleaf species (two plants per pot) and twenty plants of each cereal species (10 plants per pot). Said observations were made at intervals of two days; five days and ten to fourteen days after treatment.

The various test compounds were given a rating of from 1 to 4 with regard to their herbicidal activity on each plant and cereal species tested. A rating of 1 indicates no discernible herbicidal activity. A rating of 2 indicates a slight, but not marked herbicidal effect. A rating of 3 indicates moderate or considerable injury to plant tissues. A rating of 4 indicates marked herbicidal activity characterized by killing or severe necrosis, defoliation, or other effects, which might lead to death before maturity. The maximum rating for one species at one rate over all observed effects is 4. Thus, the highest rating for one rate of application on all the plant species tested is 24 (a total of 4 for each of the six plant species rated). Conversely, a rating of 6 indicates no visible effect. Those compounds which receive a rating of 10 or above are fairly active; a rating of 12 to 17 is indicative of good activity, while a rating of 18 to 24 is evidence of very high activity. The herbicidal activity ratings given in the examples which follow were based on the plants sprayed at the rate of 1 pound per acre.

Further advantages are illustrated, but are not to be construed as limited, by the following examples.

Example I.—Phenyldichloroarsine (intermediate)

Phenyldichloroarsine was synthesized by the method disclosed in J. Am. Chem. Soc., 44, page 805 (1922).

One hundred and ninety grams of phenylarsonic acid were added to 800 ml. concentrated HCl containing one gram of potassium iodide. Sulfur dioxide was passed into the solution until the solution was saturated. Using a separatory funnel, the oily dichloroarsine was separated from the aqueous layer, dissolved in benzene and dried over calcium chloride. Removal of the benzene resulted in a yield of 220 grams of amber liquid. This phenyldichloroarsine was used without further purification.

Example II.—Allyl phenyl arsinic acid

Fifty-five grams (0.25 mole) of phenyldichloroarsine, prepared as in Example I, were slowly added to 200 ml. of 10 N NaOH at 15° C. to 20° C. with stirring. Thirty-five grams (0.29 mole) of allyl bromide were added at a rate to maintain the temperature at 20° C. The reaction solution was refluxed for two hours and an additional 20 grams of allyl bromide were added. Reflux was continued for an additional hour. The solution was cooled to room temperature and 10 grams of salts filtered off. The pH of the filtrate was adjusted to 7 with concentrated HCl and the precipitated salts removed by filtration. The filtrate was then concentrated to approximately two-thirds volume and adjusted to a pH of 5.5 with concentrated HCl. The precipitated salts were filtered off and the filtrate adjusted to a pH of 3.5. At this pH an oil separated from the solution. The oil was removed from the aqueous layer and dried giving a yield of 29 grams. Efforts to induce crystallation were unsuccessful. The material was purified by passage through the free acid form of an ion-exchange resin (IR–120H+) yielding 17 grams of pale yellow viscous oil.

This allyl phenyl arsinic acid was soluble in water, acetone and alcohol and may be represented by the formula:

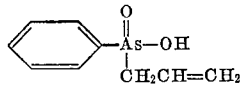

This arsinic acid had a herbicidal activity rating of 23 when evaluated according to the test procedure described above. In this test it caused complete defoliation of the Black Valentine Beans.

Example III.—Allyl o-chlorophenyl arsinic acid

Ortho-chlorophenyl arsonic acid was prepared according to the procedure outlined in J. Am. Chem. Soc., 44, page 1356, (1922) and o-chlorophenyldichloroarsine was prepared according to the method of Example I.

One hundred and twenty grams of sodium hydroxide were dissolved in 180 grams of water and this solution cooled to 0° C. Thirty-three grams (0.12 mole) of o-chlorophenyldichloroarsine were slowly added with stirring, and the resulting solution heated to 25° C. Allyl bromide (0.18 mole) was then added slowly and the reaction solution was heated to reflux for six hours. This solution, after standing overnight, separated into two layers. The organic layer was removed and dissolved in water. The pH of this solution was adjusted to 3 with concentrated HCl. At this pH an oil separated from solution. The aqueous layer was decanted off and the residue dissolved in acetone. The insoluble salts were removed by filtration. Removal of the acetone yielded 13 grams of amber-colored liquid which solidified to a waxy solid.

This allyl o-chlorophenyl arsinic acid was soluble in acetone and alcohol and may be represented by the formula:

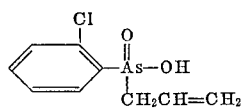

Said arsinic acid compound had a herbicidal activity rating of 24, when evaluated according to the test procedure described above.

Example IV.—2-hydroxybutyl phenyl arsinic acid

Phenyldichloroarsine (33.5 grams), prepared as in Example I, was added to 140 ml. of 10 N NaOH at 25° C. Twenty-nine grams of 1,2-butylene oxide were added gradually to this solution. The reaction solution was stirred at room temperature for six hours and allowed to stand overnight. The next day the reaction solution was heated at 55° C. for 30 minutes and cooled to room temperature. The final product was obtained by acidifying the total reaction solution to pH 3 and concentrating this solution to a thick pasty residue. The solid from the residue was filtered, thoroughly washed with acetone and air dried. The dried solid was extracted with absolute ethanol. Removal of the alcohol yielded a clear, colorless, viscous liquid. Crystallization was then induced by the addition of acetone and the yield of solid amounted to 22.5 grams.

This 2-hydroxybutyl phenyl arsinic acid had a melting point of 141° to 143° C., and was soluble in water and alcohol and insoluble in acetone. It may be represented by the formula:

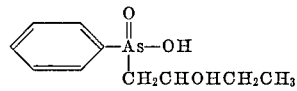

Said arsinic acid compound had a herbicidal activity rating of 20, when evaluated according to the test procedure described above.

Example V.—2-hydroxybutyl o-chlorophenyl arsinic acid

The procedure of Example IV was repeated using 26.4 grams of sodium o-chlorophenylarsenite and 22 grams of butylene oxide. The final product was isolated by acidification of the aqueous layer which separated from the reaction solution while standing at room temperature. The pH of the aqueous layer was adjusted to 3 with concentrated HCl and this solution was taken to dryness using a flash evaporator. The solid obtained was extracted with absolute ethanol for 24 hours. The cooled alcohol extract was then filtered from a small amount of inorganic solids and the filtrate was evaporated to a clear, colorless, viscous oil. The addition of 300 ml. of acetone caused solidification of the sample. The solid was then purified by crystallization from water and the yield amounted to 3 grams.

This 2-hydroxybutyl-o-chlorophenyl arsinic acid had a melting point of 150° to 152° C., and was soluble in hot water or alcohol and insoluble in acetone. It may be represented by the formula:

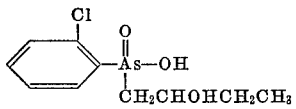

Said arsinic acid compound had a herbicidal activity of 13 when evaluated according to the test procedure described above.

Example VI.—2-hydroxybutyl m-chlorophenyl arsinic acid

The procedure of Example IV was repeated using 26.4 grams of sodium m-chlorophenylarsenite and 22 grams of butylene oxide. The final product was isolated by acidification of the organic layer which separated from the reaction solution while standing at room temperature. The pH of the organic layer was adjusted to 3.2 with concentrated HCl. At this pH a large amount of solid precipitated from solution. The solid was removed by filtration, washed thoroughly with water and acetone and air dried and the yield amounted to 22 grams.

This 2-hydroxybutyl m-chlorophenyl arsinic acid had a melting point of 153° to 157° C. and was soluble in absolute or aqueous ethanol and insoluble in water or acetone. It may be represented by the formula:

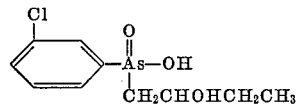

said arsinic acid compound had a herbicidal activity rating of 16, when evaluated according to the test procedure described above.

Example VII.—2-hydroxypropyl phenyl arsinic acid

The procedure of Example IV was repeated using 23 grams of sodium phenylarsenite and 25.7 grams of propylene oxide. The final product was isolated as follows: The reaction solution was filtered from a small amount of precipitated solids, neutralized with concentrated HCl and refiltered. This filtrate was concentrated to one-half volume, cooled to room temperature and the precipitated salts were removed by filtration. The clear filtrate was acidified to pH 3 with concentrated HCl. At this pH solid and oil separated from solution. This mixture was then filtered and the filtrate concentrated to a pasty residue. The residue was filtered using suction and the oily filtrate thus obtained was dissolved in acetone. Precipitation of the solid from this acetone solution occurred shortly. This solid was removed by filtration and air dried. The yield amounted to 16 grams.

This 2-hydroxyproply phenyl arsinic acid had a melting point of 133° C. to 135° C. and was slightly soluble in water or alcohol and insoluble in acetone. It may be represented by the formula:

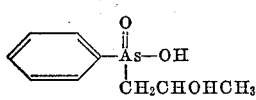

Said arsinic acid compound had a herbicidal activity rating of 18, when evaluated according to the test procedure described above.

Example VIII.—2-hydroxypropyl o-chlorophenyl arsinic acid

The process according to Example VII was followed using 26.4 grams of sodium o-chlorophenylarsenite and 25.7 grams of propylene oxide. The yield of 2-hydroxypropyl o-chlorophenyl arsinic acid was 6 grams.

Said arsinic acid compound had a melting point of 150° C. to 154° C., was soluble in water or alcohol and insoluble in acetone and may be represented by the formula:

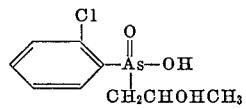

This 2-hydroxypropyl-o-chlorophenyl arsinic acid had a herbicidal activity rating of 22, when evaluated according to the test process described above.

Example IX.—2-Hydroxypropyl m-chlorophenyl arsenic acid

The process according to Example VIII was followed using 26.4 grams of sodium m-chlorophenylarsenite. The yield of 2-hydroxypropyl m-chlorophenyl arsinic acid was 4.5 grams.

Said arsinic acid compound had a melting point of 146° C. to 149° C., was soluble in water or alcohol and insoluble in acetone and may be represented by the formula:

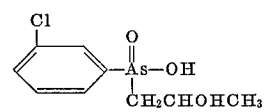

This 2-hydroxypropyl m-chlorophenyl arsinic acid compound had a herbicidal activity rating of 15, when evaluated according to the test procedure described above.

Example X.—2-hydroxyethyl-o-chlorophenyl arsinic acid

Ethylene oxide (14 grams) was reacted with 26.4 grams of sodium-o-chlorophenyl-arsenite in a 10 N sodium hydroxide solution. Acidification and concentration of the reaction solution followed by ether extraction of an alcoholic solution of the final concentrate resulted in the isolation of a slightly viscous ether solution. Removal of the ether left a very viscous residue which when dissolved in a minimum amount of methanol and diluted with ether yielded 15 grams of a white tacky solid. Concentration of the alcohol-ether filtrate yielded 6 grams of the final product.

This 2-hydroxyethyl-o-chlorophenyl arsinic acid had a melting point of 129° C. to 132° C., was soluble in absolute or aqueous ethanol and insoluble in acetone or cold water. It may be represented by the formula:

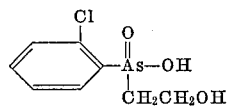

Said arsinic acid compound had a herbicidal activity rating of 19, when evaluated by the test procedure described above.

Example XI.—2-hydroxy butyl p-chloro phenyl arsinic acid

The synthesizing steps of Example IV were repeated using 26.4 grams of sodium p-chlorophenylarsenite and 22 grams of butylene oxide. The final product was isolated from the reaction solution by acidification of the organic layer and the purification was carried out as described in Example VI. The yield amounted to 6 grams.

This 2-hydroxybutyl p-chlorophenyl arsinic acid had a melting pont of 155°–158° C., was soluble in absolute or aqueous ethanol and insoluble in acetone or cold water. It may be represented by the formula:

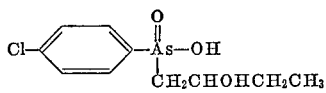

Said arsinic acid compound had a herbicidal activity rating of 21, when evaluated by the test procedure described above.

Example XII.—2-hydroxybutyl o-methoxyphenyl arsinic acid

The procedure of Example IV was repeated using 24.4 grams of sodium o-methoxyphenylarsenite and 21 grams of butylene oxide. The final product was isolated as described in Example VI and the yield amounted to 5 grams.

This 2-hydroxybutyl o-methoxyphenyl arsinic acid had a melting point of 146° to 148° C., was soluble in absolute or aqueous alcohol and insoluble in acetone or cold water. It may be represented by the formula:

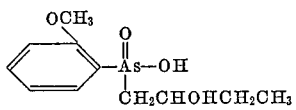

Said arsinic acid compound had a herbicidal activity rating of 23, when evaluated accordng to the test procedure described above.

Example XIII.—2-hydroxybutyl p-methoxyphenyl arsinic acid

Example XII was repeated using 24.4 grams of sodium p-methoxyphenylarsenite and 22 grams of butylene oxide. The yield amounted to 4 grams.

This 2-hydroxybutyl p-methoxyphenyl arsinic acid had a melting point of 144° to 145° C., was soluble in absolute or aqueous ethanol and insoluble in acetone or cold water. It may be represented by the formula:

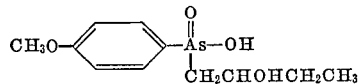

Said arsinic acid compound had a herbicidal activity rating of 22, when evaluated according to the test procedure described above.

Example XIV.—2-phenyl-2-hydroxyethyl phenyl arsinic acid

The synthesizing steps of Example IV were repeated using 23 grams of sodium phenylarsenite and 36 grams of styrene oxide. At the completion of the reaction, two layers were present. The upper organic layer contained a large amount of solid. The solid was dissolved in water and the pH slowly adjusted to 3.0. As this pH was approached, precipitation of solid occurred. The precipitate was isolated by filtration, washed well with acetone and air dried. The yield amounted to 9.5 grams.

This 2-phenyl-2-hydroxyethyl phenyl arsinic acid had a melting pont of 158° to 161° C., was soluble in absolute or aqueous ethanol and insoluble in acetone or cold water. It may be represented by the formula:

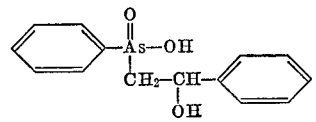

Said arsinic acid compound had a herbicidal rating of 19, when evaluated according to the test procedure described above.

Example XV.—2-phenyl-2-hydroxyethyl m-chlorophenyl arsinic acid

Example XIV was repeated using 26.4 grams of sodium m-chlorophenylarsenite and 36 grams of styrene oxide. The yield amounted to 18 grams. This 2-phenyl-2-hydroxyethyl m-chlorophenyl arsinic acid had a melting point of 181° C. to 184° C., was soluble in absolute or aqueous ethanol and insoluble in acetone or cold water. It may be represented by the formula:

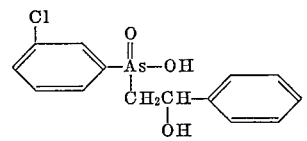

Said arsinic acid compound had a herbicidal activity rating of 12, when evaluated by the test procedure described above.

Example XVI.—2-phenyl-2-hydroxyethyl p-chlorophenyl arsinic acid

Example XIV was repeated using 26.4 grams of sodium p-chlorophenylarsenite and 36 grams of styrene oxide. The yield amounted to 10 grams.

This 2-phenyl-2-hydroxyethyl p-chlorophenyl arsinic acid compound had a melting point of 158° to 161° C., was soluble in absolute or aqueous ethanol and insoluble in acetone or cold water. It may be represented by the formula:

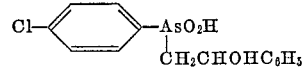

Said arsinic acid compound had a herbicidal activity rating of 21, when evaluated according to the test procedure described above. In this test it caused complete defoliation of the Black Valentine Beans.

Various modifications and variations of this invention will be obvious to a worker skilled in the art.

We claim:

1. Aryl alkyl arsinic acid compounds having the general formula:

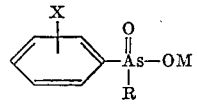

wherein X represents a member selected from the group consisting of hydrogen, chlorine and methoxy radicals; wherein R represents a member selected from the group consisting of allyl, 2-hydroxy lower alkyl and 2-phenyl-2-hydroxyethyl radicals; and wherein M represents a member selected from the group consisting of hydrogen, an alkali metal, an alkaline earth metal, an ammonium ion and an amine salt moiety.

2. Aryl alkyl arsinic acid compounds according to claim 1, wherein R represents an allyl radical.

3. Aryl alkyl arsinic acid compounds according to claim 1, wherein R represents a 2-hydroxy lower alkyl radical.

4. Aryl alkyl arsinic acid compounds according to claim 1, wherein R represents a 2-phenyl-2-hydroxyethyl radical.

5. Aryl alkyl arsinic acid compounds according to claim 1, wherein X represents hydrogen and R represents an allyl radical.

6. Aryl alkyl arsinic acid compounds according to claim 1, wherein X represents chlorine and R represents an allyl radical.

7. Aryl alkyl arsinic acid compounds according to claim 1, wherein X represents hydrogen and R represents a 2-hydroxy lower alkyl radical.

8. Aryl alkyl arsinic acid compounds according to claim 1, wherein X represents chlorine and R represents a 2-hydroxy lower alkyl radical.

9. Aryl alkyl arsinic acid compounds according to claim 1, wherein X represents a methoxy radical and R represents a 2-hydroxy lower alkyl radical.

10. Aryl alkyl arsinic acid compounds according to claim 1, wherein X represents hydrogen and R represents a 2-phenyl-2-hydroxyethyl radical.

11. Aryl alkyl arsinic acid compounds according to claim 1, wherein X represents chlorine and R represents a 2-phenyl-2-hydroxyethyl radical.

References Cited

UNITED STATES PATENTS

| | | | |
|---|---|---|---|
| 2,312,207 | 2/1943 | Clayton et al. | 260—440 X |
| 2,346,155 | 4/1944 | Denison et al. | 260—440 X |
| 2,701,812 | 2/1955 | Takahashi et al. | 260—440 |
| 3,322,805 | 5/1967 | Schanhals | 260—440 |

HELEN M. McCARTHY, *Primary Examiner.*

W. F. W. BELLAMY, *Assistant Examiner.*

U.S. Cl. X.R.

260—271, 440; 71—82, 83, 97